US011137412B2

(12) United States Patent
Nakamura (10) Patent No.: US 11,137,412 B2
(45) Date of Patent: Oct. 5, 2021

(54) DISPENSING UNIT AND AUTOMATED ANALYZER

(71) Applicant: JEOL Ltd., Tokyo (JP)

(72) Inventor: Mizuki Nakamura, Tokyo (JP)

(73) Assignee: JEOL Ltd., Tokyo (JP)

( * ) Notice: Subject to any disclaimer, the term of this patent is extended or adjusted under 35 U.S.C. 154(b) by 162 days.

(21) Appl. No.: 16/665,412

(22) Filed: Oct. 28, 2019

(65) Prior Publication Data

US 2020/0132710 A1    Apr. 30, 2020

(30) Foreign Application Priority Data

Oct. 30, 2018    (JP) .............................. JP2018-203781

(51) Int. Cl.
*G01N 35/10* (2006.01)
*G01N 35/04* (2006.01)

(52) U.S. Cl.
CPC ..... *G01N 35/1009* (2013.01); *G01N 35/1065* (2013.01); *G01N 35/1081* (2013.01); *G01N 2035/0491* (2013.01); *G01N 2035/1027* (2013.01)

(58) Field of Classification Search
None
See application file for complete search history.

(56) References Cited

U.S. PATENT DOCUMENTS

2005/0194394 A1* 9/2005 Ueda .................. G01N 35/1011
221/4

FOREIGN PATENT DOCUMENTS

| JP | 3-183958 | * | 8/1991 |
| JP | 201189957 A | | 5/2011 |

* cited by examiner

*Primary Examiner* — Kathryn Wright
(74) *Attorney, Agent, or Firm* — The Webb Law Firm (57) ABSTRACT

There is provided a dispensing unit capable of alleviating the load on a dispensing unit and other components at the time of a collision while maintaining the vibration-suppressing function. Also, an automated analyzer having this dispensing unit is provided. The dispensing unit has a dispensing probe, a drive mechanism, an arm member, a first probe holder, a second probe holder, a first support spring, second support springs, and vibration dampers. The second probe holder is supported to the first probe holder so as to be movable vertically and holds the dispensing probe. The second support springs bias the second probe holder against the first probe holder and in combination have a spring constant smaller than that of the first support spring. The vibration dampers are bridged from the arm member to the second probe holder.

8 Claims, 11 Drawing Sheets

DISPENSING UNIT AND AUTOMATED ANALYZER

CROSS-REFERENCE TO RELATED APPLICATION

This application claims priority to Japanese Patent Application No. 2018-203781 filed Oct. 30, 2018, the disclosure of which is hereby incorporated by reference in its entirety.

BACKGROUND OF THE INVENTION

Field of the Invention

The present invention relates to a dispensing unit for dispensing liquid. The invention also relates to an automated analyzer equipped with this dispensing unit.

Description of Related Art

Automated analyzers are used in testing conducted in various fields such as biochemical testing and blood transfusion testing, and operate to analyze multiple analyte constituents quickly and accurately. An automated analyzer has a dispensing unit for aspirating and delivering (i.e., dispensing) liquids such as analytes and reagents.

One conventional dispensing unit is described, for example, in JP-A-2011-89957. This conventional unit is a probe vibration control device using a probe. In order to move up and down, rotate, and translate the probe, the other end of the probe is supported at one end of a first probe support member. The other end of the first probe support member is coupled to a rotary shaft/up-down motion shaft. In the technique of this JP-A-2011-89957, a part of the other end of the probe is secured to a second probe support member so as to protrude from the first probe support member. An elastic member is inserted between the second and first probe support members. A probe driving shaft is mounted between the second probe support member and the rotary shaft/up-down motion shaft to provide operational stability.

In the technique set forth in JP-A-2011-89957, the probe holder is supported by one support spring, and vibrations occurring in the probe holder and in the dispensing probe are suppressed. Therefore, in order to have improved vibration suppressing effects, it is necessary to set the spring constant of the support spring to a large value. This increases the impact on the dispensing probe and on the collided member when the dispensing probe collides with the latter member. As a result, a disadvantage arises, namely, the dispensing probe and the collided member may be damaged.

Where the spring constant of the support spring is set smaller in an attempt to suppress damage to the dispensing probe and to the collided member, vibrations produced in the probe holder and in the dispensing probe cannot be suppressed.

SUMMARY OF THE INVENTION

In view of the foregoing problem, it is an object of the present invention to provide a dispensing unit and automated analyzer capable of alleviating the load on the dispensing unit and other components during a collision while retaining the vibration suppressing function.

A dispensing unit which is free of the foregoing problem and built in accordance with the teachings of the present invention has a dispensing probe for aspirating and dispensing liquid, a drive mechanism, an arm member, a first probe holder, a second probe holder, a first support spring, second support springs, and vibration dampers. The drive mechanism has a support shaft that is supported so as to be rotatable peripherally and movable vertically. The arm member is mounted to the support shaft and has first and second ends on mutually opposite sides. The first probe holder is attached to the arm member at the first end thereof and supports the dispensing probe such that the probe can move vertically. The second probe holder is supported to the first probe holder so as to be movable vertically and holds the dispensing probe. The first support spring is interposed between the arm member and the first probe holder and suppresses vibrations produced in the dispensing probe. The second support springs bias the second probe holder against the first probe holder and in combination have a spring constant smaller than that of the first support spring. The vibration dampers are bridged from the second end of the arm member (that is on the opposite side of the first end of the arm member at which the first probe holder is mounted) to the second probe holder, thus suppressing vibrations produced in the dispensing probe.

An automated analyzer according to the present invention comprises: a container unit having a plurality of receptacles that holds liquid; and a dispensing unit for aspirating and dispensing the liquid. The dispensing unit described just above is used as the dispensing unit of this automated analyzer.

The dispensing unit and automated analyzer of the above-described configuration allows for suppression of load imposed on the dispensing probe and other components in a collision while maintaining the vibration suppressing function.

DESCRIPTION OF THE INVENTION

Embodiments of the dispensing unit and automated analyzer of the present invention are hereinafter described with reference to FIGS. 1-11B. In the various figures, identical or similar members are identified by the same reference numerals.

1. Non-limiting Embodiments 1-1. Configuration of Automated Analyzer

Figure 1:
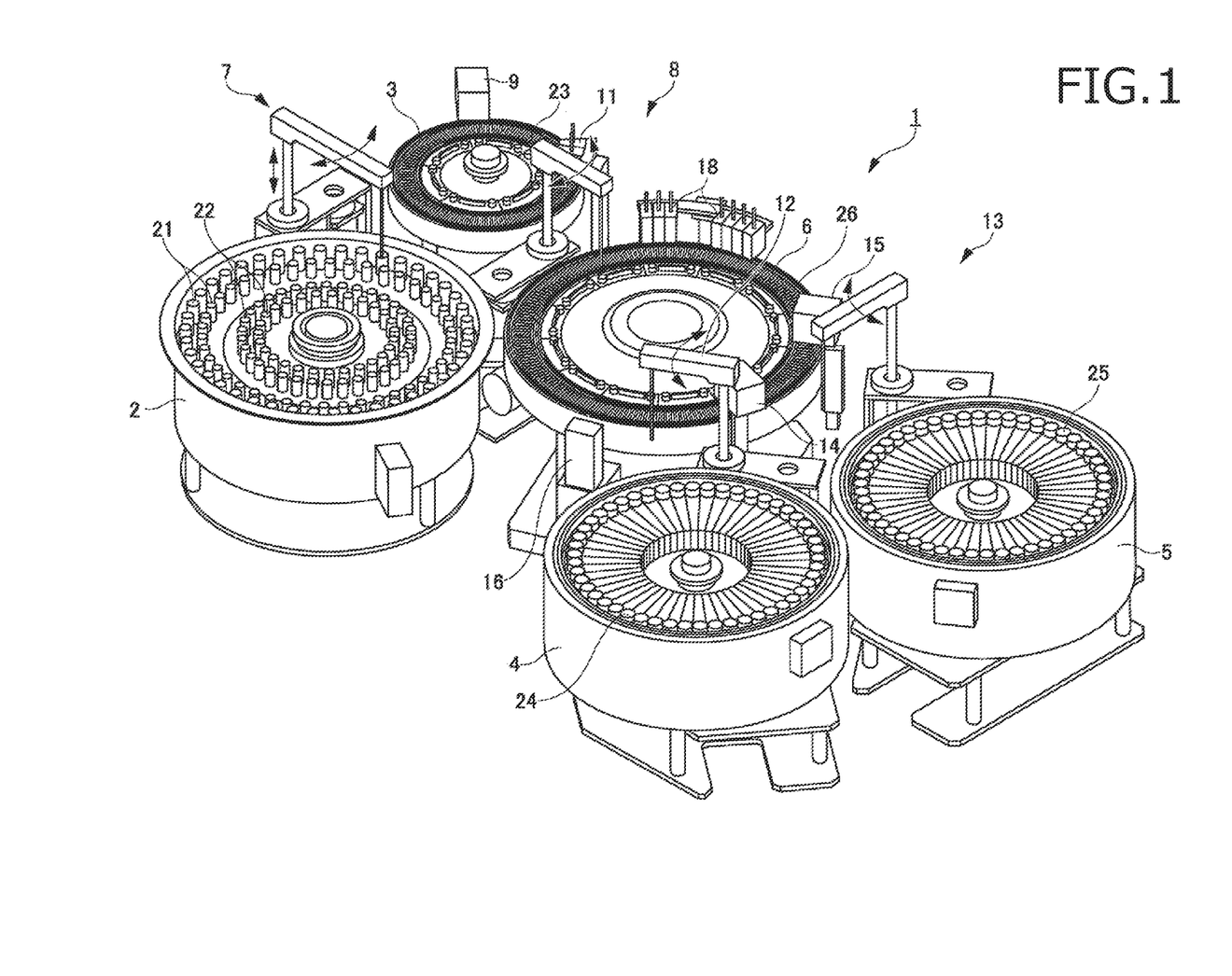
FIG. 1 is a schematic perspective view of an automated analyzer associated with one embodiment of the present invention.

An automated analyzer associated with one embodiment of the present invention is first described by referring to FIG. 1, which is a schematic perspective view of the analyzer.

The instrument, 1, shown in FIG. 1 is a biochemical analyzer that is one example of the automated analyzer of the present invention. The biochemical analyzer 1 automatically measures the amounts of certain components contained in a biological sample such as blood or urine.

The biochemical analyzer 1 has a sample turntable 2, a dilution turntable 3, a first reagent receptacle-receiving unit 4, a second reagent receptacle-receiving unit 5, and a reaction turntable 6. Furthermore, the biochemical analyzer 1 has a sample dilution unit 7, a sampling unit 8, a dilution and stirring device 9, a dilution and cleaning device 11, a first dispensing unit 12, a second dispensing unit 13, a first reaction stirrer 14, a second reaction stirrer 15, a multiwavelength photometer 16, and a reaction receptacle-cleaning device 18. In addition, the biochemical analyzer 1 includes a controller for controlling the whole instrument.

The sample turntable 2 is shaped like a container substantially in the form of a cylinder whose one axial end is open. The sample turntable 2 accommodates a plurality of analyte receptacles 21 and a plurality of diluent receptacles 22. An analyte (sample) consisting of blood, urine, or the like is received in each analyte receptacle 21. A special diluent other than physiological salt solution being a normal diluent is received in each diluent receptacle 22.

The analyte receptacles 21 are placed in the sample turntable 2 and arranged at regular intervals peripherally of the sample turntable 2. The analyte receptacles 21 arranged inside and peripherally of the sample turntable 2 form two rows which are spaced apart a given spacing radially of the sample turntable 2.

The diluent receptacles 22 are disposed inside the rows of the analyte receptacles 21 as viewed radially of the sample turntable 2. Similarly to the analyte receptacles 21, the diluent receptacles 22 are arranged at given intervals peripherally of the sample turntable 2 and form two rows which are spaced apart a given spacing radially of the sample turntable 2.

The number of rows of the analyte receptacles 21 and of the diluent receptacles 22 is not restricted to two. Each set of receptacles 21 or 22 may form one row or three or more rows radially of the sample turntable 2.

The sample turntable 2 is supported so as to be rotatable peripherally by a drive mechanism (not shown). The sample turntable 2 is rotated peripherally at a given speed through each given angular range by the drive mechanism (not shown). The dilution turntable 3 is disposed beside the sample turntable 2.

Each of the dilution turntable 3 and the reaction turntable 6 is shaped like a container substantially in the form of a cylinder whose one axial end is open, in the same way as the sample turntable 2. The dilution turntable 3 and the reaction turntable 6 are rotated peripherally at given speeds through each given angular range by their respective drive mechanisms (not shown).

A plurality of dilution receptacles 23 are received in the dilution turntable 3 and arranged peripherally of this turntable 3. An analyte sucked from a selected one of the analyte receptacles 21 arranged in the sample turntable 2 is diluted (hereinafter referred to as the "diluted analyte") and received in one of the dilution receptacles 23.

A plurality of first reagent receptacles 24 are accommodated in the first reagent receptacle-receiving unit 4 and arranged peripherally of the first reagent receptacle-receiving unit 4. A plurality of second reagent receptacles 25 are accommodated in the second reagent receptacle-receiving unit 5 representing a receptacle-receiving unit, and are arranged peripherally of the second reagent receptacle-receiving unit 5. A first reagent is received in each first reagent receptacle 24. A second reagent is received in each second reagent receptacle 25.

The first reagent receptacle-receiving unit 4, first reagent receptacles 24, second reagent receptacle-receiving unit 5, and the second reagent receptacles 25 are kept at a given temperature by a cold reserving mechanism (not shown). Therefore, the first reagent received in the first reagent receptacles 24 and the second reagent received in the second reagent receptacles 25 are kept at a given cool temperature.

The reaction turntable 6 is disposed among the dilution turntable 3, the first reagent receptacle-receiving unit 4, and the second reagent receptacle-receiving unit 5. A plurality of reaction receptacles 26 are accommodated in the reaction turntable 6 and arranged peripherally of the reaction turntable 6. A diluted analyte sampled from a selected one of the dilution receptacles 23 in the dilution turntable 3, a first reagent sampled from a selected one of the first reagent receptacles 24 in the first reagent receptacle-receiving unit 4, and a second reagent sampled from a selected one of the second reagent receptacles 25 in the second reagent receptacle-receiving unit 5 are injected into each reaction receptacle 26. In the reaction receptacle 26, the diluted analyte, the first reagent, and the second reagent are stirred together, and a reaction is induced.

The sample dilution unit 7 that represents one example of a dispensing unit is disposed close both to the outer periphery of the sample turntable 2 and to the outer periphery of the dilution turntable 3. The sample dilution unit 7 is supported such that the dispensing probe can be moved axially (e.g., vertically) of the sample turntable 2 and of the dilution turntable 3 by a drive portion (not shown).

The probe of the sample dilution unit 7 is supported such that it can be rotated by a drive mechanism in a horizontal direction that is substantially parallel to the openings in the sample turntable 2 and in the dilution turntable 3. The sample dilution unit 7 rotates in the horizontal direction, thus reciprocating between the sample turntable 2 and the dilution turntable 3. During this reciprocative motion between the turntables 2 and 3, the dispensing probe of the sample dilution unit 7 passes through a cleaning device (not shown).

The operation of the sample dilution unit 7 is now described. When the sample dilution unit 7 moves into a given position above the opening in the sample turntable 2, the dilution unit 7 descends axially of the sample turntable 2, and the dispensing probe at the tip of the dilution unit 7 is inserted into a selected one of the analyte receptacles 21. At this time, a pump in the dilution unit 7 operates and aspirates a given amount of the analyte received in the analyte receptacle 21. Then, the dilution unit 7 ascends axially of the sample turntable 2 and withdraws the dispensing probe from inside the analyte receptacle 21. The sample dilution unit 7 rotates in the horizontal direction and moves into the given position above the opening in the dilution turntable 3.

The sample dilution unit 7 then descends axially of the dilution turntable 3, inserting the dispensing probe into a given one of the dilution receptacles 23. The sample dilution unit 7 dispenses an aspirated analyte and a given amount of diluent (e.g., physiological salt solution) supplied from the sample dilution unit 7 itself into the dilution receptacle 23. As a result, the concentration of the analyte is diluted by a given factor within the dilution receptacle 23. Then, the sample dilution unit 7 is cleaned with the cleaning device.

The sampling unit 8 representing one example of a dispensing unit is disposed between the dilution turntable 3 and the reaction turntable 6. The sampling unit 8 is supported such that the probe can be moved axially (vertically) of the dilution turntable 3 and in the horizontal direction and rotated by drive mechanisms (not shown) in the same way as the sample dilution unit 7. The sampling unit 8 reciprocates between the dilution turntable 3 and the reaction turntable 6.

The sampling unit 8 inserts the probe into the dilution receptacle 23 in the dilution turntable 3 and aspirates a given amount of diluted analyte. The sampling unit 8 discharges the aspirated, diluted analyte into each reaction receptacle 26 in the reaction turntable 6.

The first dispensing unit 12 representing one example of a dispensing unit is disposed between the reaction turntable 6 and the first reagent receptacle-receiving unit 4. The second dispensing unit 13 is disposed between the reaction turntable 6 and the second reagent receptacle-receiving unit 5. The first dispensing unit 12 has a dispensing probe 33 that is supported so as to be movable axially (vertically) of the reaction turntable 6 and in the horizontal direction and rotatable by drive portions 42 and 43 (see FIG. 2). The first dispensing unit 12 reciprocates between the first reagent receptacle-receiving unit 4 and the reaction turntable 6.

The first dispensing unit 12 inserts a dispensing probe into a selected one of the first reagent receptacles 24 of the first reagent receptacle-receiving unit 4 and aspirates a given amount of the first reagent. The first dispensing unit 12 dispenses the aspirated first reagent into the reaction receptacles 26 in the reaction turntable 6. The configuration of the first dispensing unit 12 is described in detail later.

The second dispensing unit 13 representing one example of a dispensing unit is so supported that the dispensing probe can be moved axially (vertically) of the reaction turntable 6 and in the horizontal direction and rotated by a drive mechanism (not shown), in the same way as the first dispensing unit 12. The second dispensing unit 13 reciprocates between the second reagent receptacle-receiving unit 5 and the reaction turntable 6.

The second dispensing unit 13 inserts the dispensing probe into a selected one of the second reagent receptacles 25 of the second reagent receptacle-receiving unit 5 and aspirates a given amount of the second reagent. The second dispensing unit 13 dispenses the aspirated second reagent into the reaction receptacles 26 in the reaction turntable 6.

The dilution and stirring device 9 and the dilution and cleaning device 11 are arranged around the dilution turntable 3. The dilution and stirring device 9 inserts a stirring element (not shown) into the dilution receptacle 23 and stirs together the analyte and the diluent.

The dilution and cleaning device 11 cleans the dilution receptacle 23 from which the diluted analyte has been aspirated by the sampling unit 8. The dilution and cleaning device 11 has a plurality of diluent receptacle-cleaning nozzles which are connected with a waste pump (not shown) and with a detergent pump (not shown). The dilution and cleaning device 11 inserts the dilution receptacle-cleaning nozzles into the dilution receptacle 23 and drives the waste pump to aspirate the diluted analyte remaining in the dilution receptacle 23 by the inserted dilution receptacle-cleaning nozzles. The dilution and cleaning device 11 then discharges the aspirated diluted analyte into a waste tank (not shown).

Then, the dilution and cleaning device 11 supplies a detergent into the dilution receptacle-cleaning nozzles from the detergent pump and delivers the detergent into the dilution receptacle 23 from the dilution receptacle-cleaning nozzles. The inside of the dilution receptacle 23 is cleaned with the detergent. Then, the dilution and cleaning device 11 dries the inside of the dilution receptacle 23 which aspirated the detergent through the dilution receptacle-cleaning nozzles.

The first reaction stirrer 14, second reaction stirrer 15, and reaction receptacle-cleaning device 18 are arranged around the reaction turntable 6. The first reaction stirrer 14 inserts a stirring element (not shown) into a selected one of the reaction receptacles 26 and stirs together the diluted analyte and the first reagent. Consequently, a reaction is produced uniformly and quickly between the diluted analyte and the first reagent. The first reaction stirrer 14 is identical in configuration to the dilution and stirring device 9 and so a description of the stirrer 14 is omitted herein.

The second reaction stirrer 15 inserts a stirring element (not shown) into the reaction receptacle 26 and stirs together the diluted analyte, the first reagent, and the second reagent. Consequently, a reaction is effected uniformly and quickly among the diluted analyte, the first reagent, and the second reagent. The second reaction stirrer 15 is identical in configuration to the dilution and stirring device 9 and so a description of the second reaction stirrer 15 is omitted herein.

The reaction receptacle-cleaning device 18 cleans the inside of the reaction receptacle 26 for which an inspection is complete. The cleaning device 18 has a plurality of reaction receptacle-cleaning nozzles which are connected with a waste pump (not shown) and with a detergent pump (not shown), in the same way as the dilution receptacle-cleaning nozzles. The cleaning step done by the reaction receptacle-cleaning device 18 is similar to the cleaning step done by the aforementioned dilution and cleaning device 11 and so a description thereof is omitted.

The multi-wavelength photometer 16 is positioned opposite to the outer peripheral wall of the reaction turntable 6. The multi-wavelength photometer 16 performs optical measurements on the diluted analytes which have reacted with the first and second reagents after being injected into the reaction receptacles 26, outputs numerical data representing the "absorbances" of the amounts of various components of the analytes, and detects how the diluted analytes have reacted.

A thermostat bath (not shown) is disposed around the reaction turntable 6. The thermostat bath is configured such that the temperatures of the reaction receptacles 26 placed in the reaction turntable 6 are maintained constant at all times.

1-2. Configuration of Dispensing Unit

Figure 2:
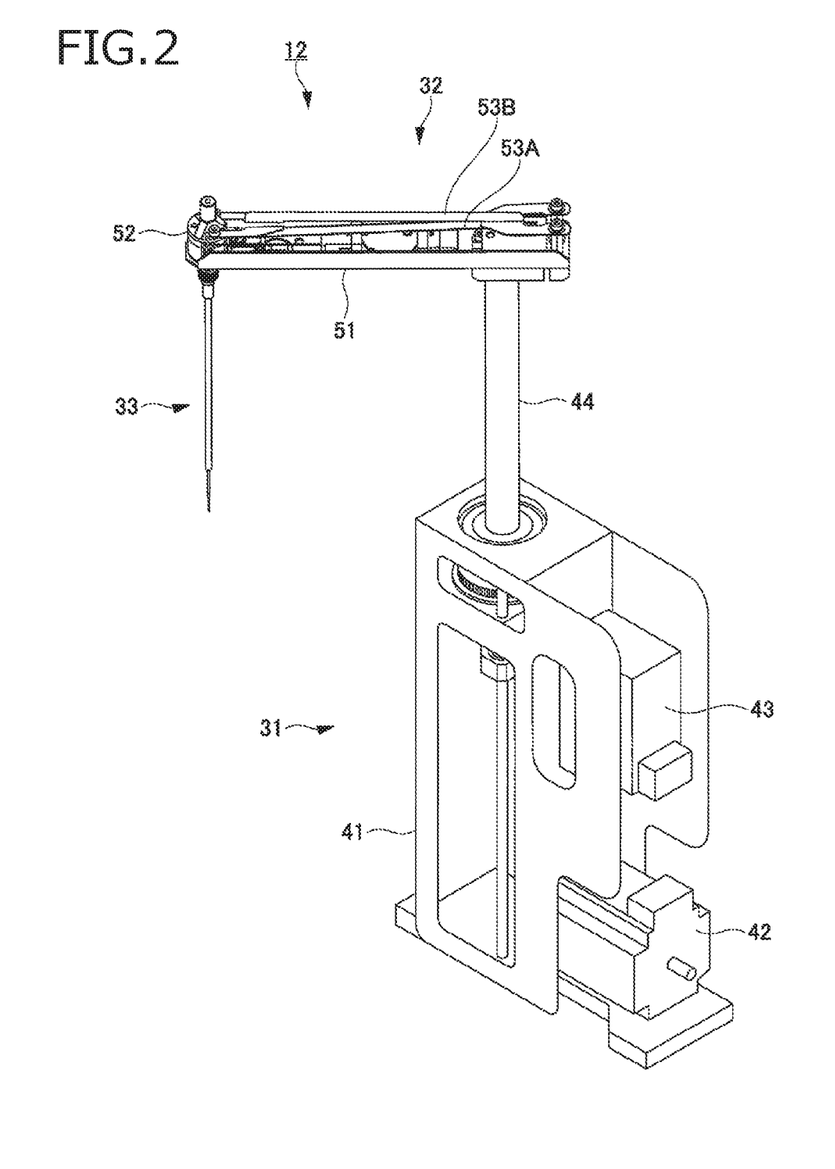
FIG. 2 is a perspective view of the dispensing unit shown in FIG. 1.
Figure 3:
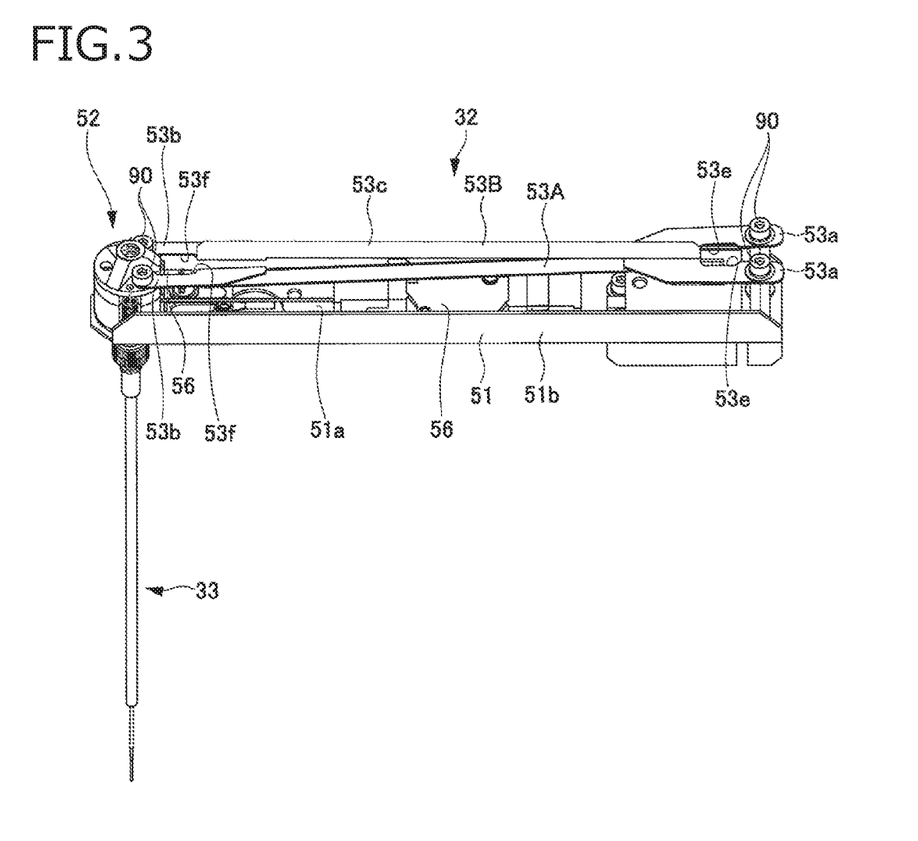
FIG. 3 is a perspective view of the dispensing arm of the dispensing unit of FIG. 2.

The configuration of the dispensing unit is next described in detail by referring to FIGS. 2 and 3. In the following description, the configuration of the first dispensing unit 12 is described as a dispensing unit, and the first dispensing unit will hereinafter be simply referred to as the dispensing unit 12. Note that the dispensing unit is not limited to the first dispensing unit 12. Rather, the configuration of the first dispensing unit 12 may also be applied to the sample dilution unit 7, sampling unit 8, and second dispensing unit 13.

FIG. 2 is a perspective view of the dispensing unit 12. As shown in FIG. 2, the dispensing unit 12 has a drive mechanism 31, a dispensing arm 32, and the dispensing probe 33 for aspirating and dispensing liquid. Furthermore, the dispensing unit 12 has a pump connected with the dispensing probe 33.

The drive mechanism 31 has an enclosure 41, the first drive portion 42, the second drive portion 43, and a support shaft 44. The first drive portion 42 and second drive portion 43 are formed in the enclosure 41.

The support shaft 44 is disposed in the enclosure 41 such that the axial direction of the shaft 44 is substantially parallel to a vertical direction. The support shaft 44 is supported to the enclosure 41 rotatably and vertically movably. The support shaft 44 is rotated by the first drive portion 42 formed in the enclosure 41 and moved in the vertical direction by the second drive portion 43. The dispensing arm 32 has an arm member 51 (described later) securely held to one axial end of the support shaft 44, i.e., the top end in the vertical direction.

Figure 4:
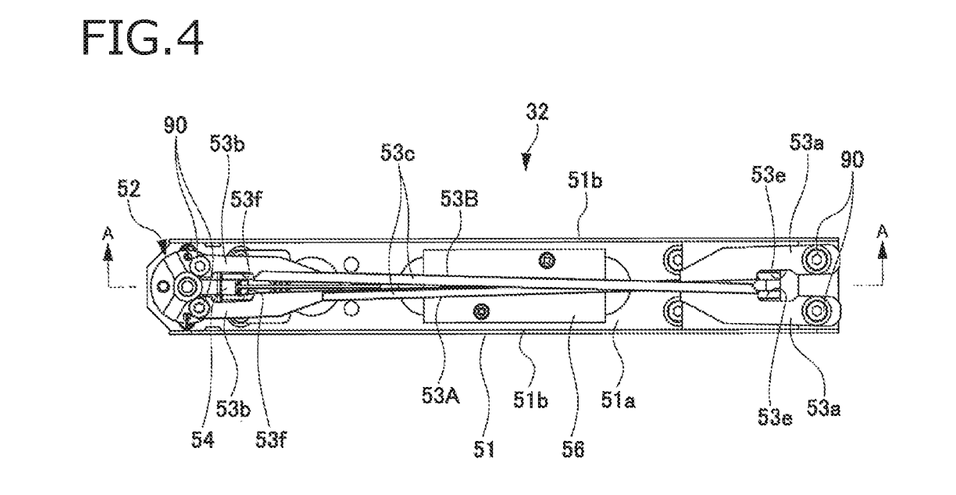
FIG. 4 is a plan view of the dispensing arm shown in FIGS. 2 and 3.
Figure 5:
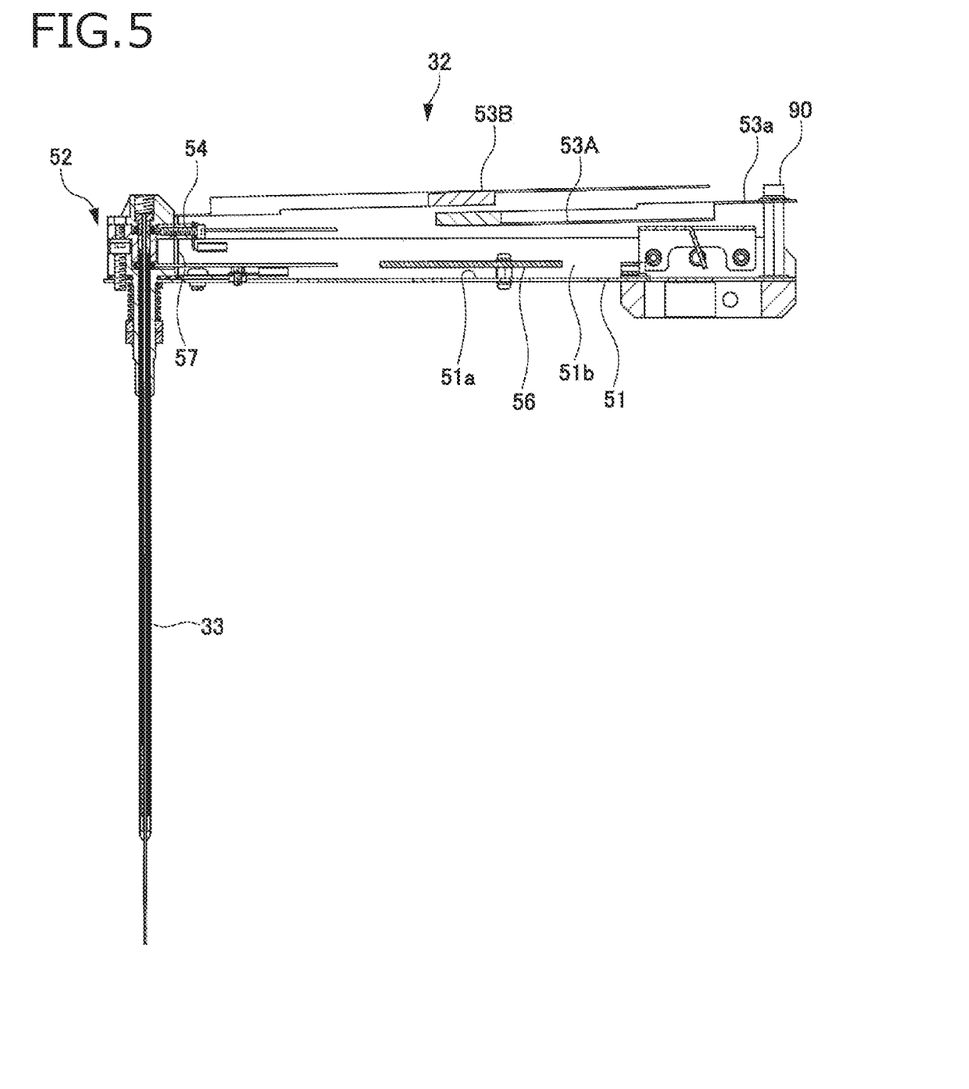
FIG. 5 is a cross-sectional view taken on line A-A of FIG. 4.
Figure 6:
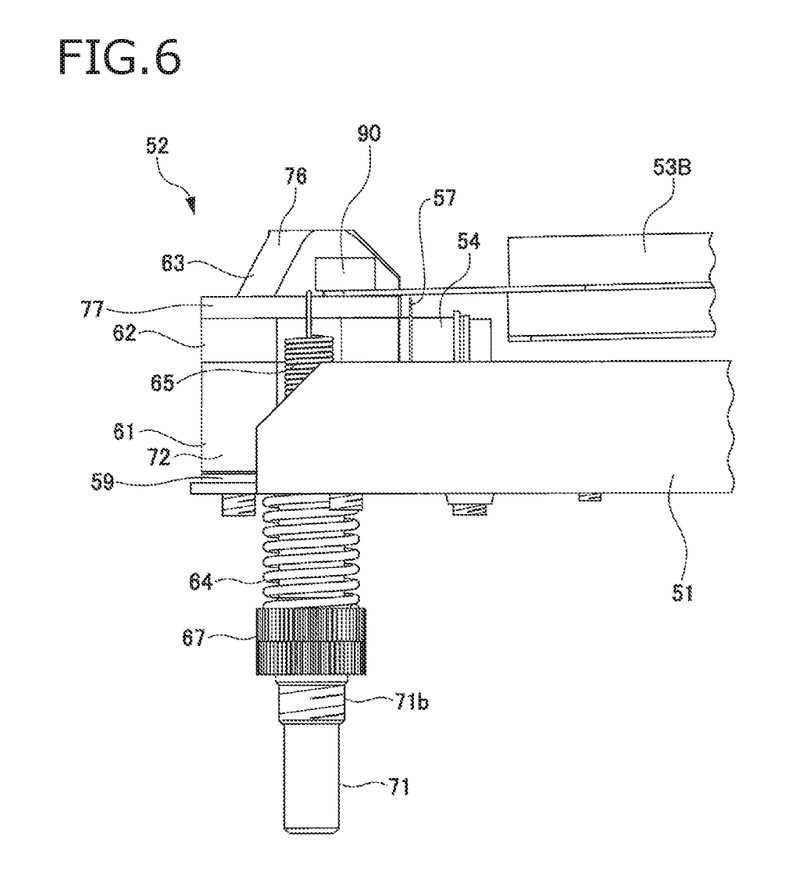
FIG. 6 is a side elevation of the main portions of the dispensing arm shown in FIGS. 2-5.
Figure 7:
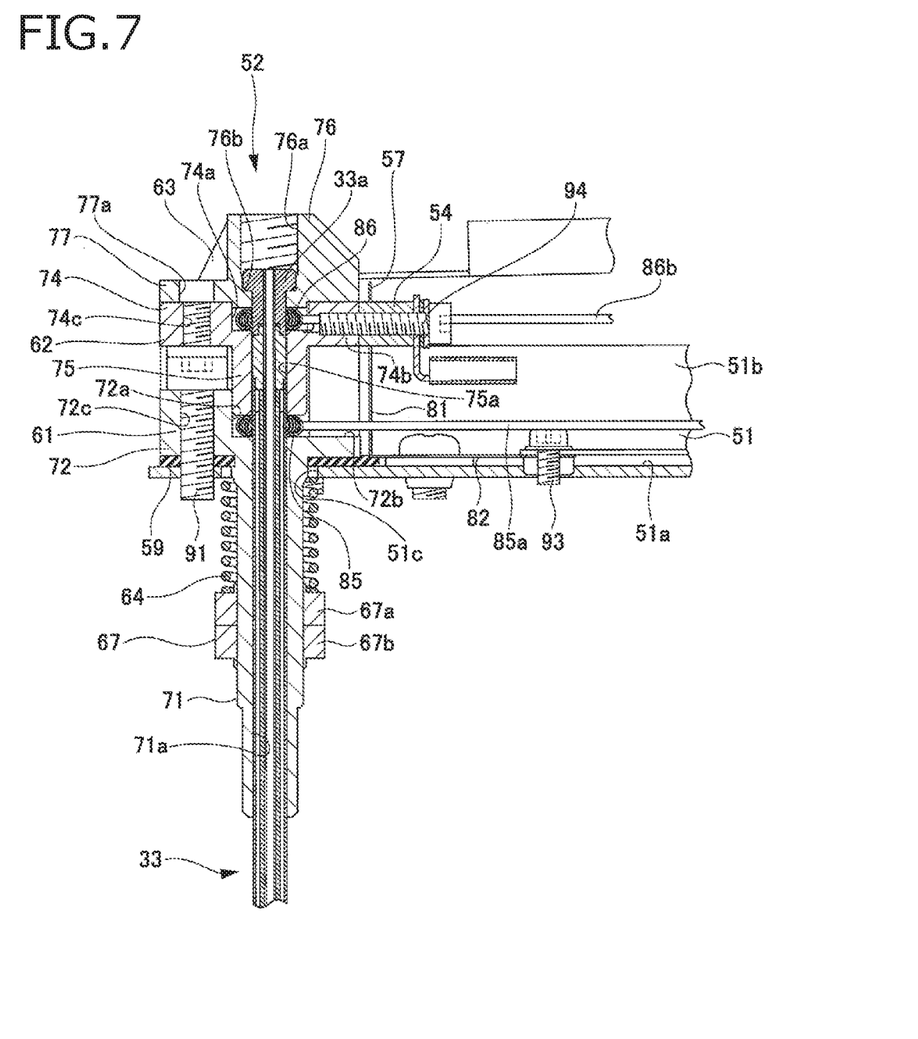
FIG. 7 is an enlarged cross-sectional view of the main portions of the dispensing arm of FIG. 6.
Figure 8:
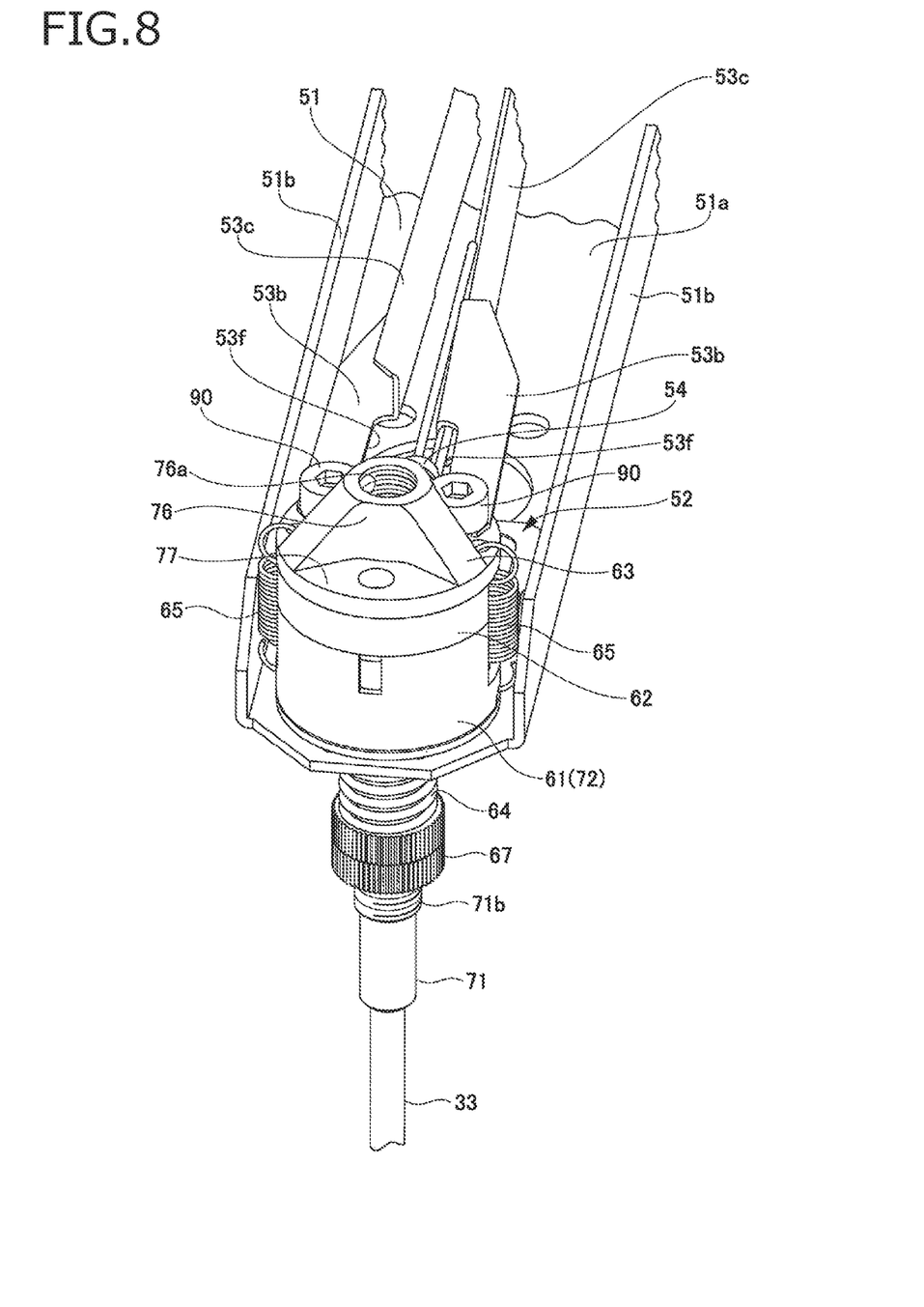
FIG. 8 is a perspective view of the main portions of the dispensing arm of FIGS. 6 and 7.

FIG. 3 is a perspective view of the dispensing arm 32. FIG. 4 is a plan view of the dispensing arm 32. FIG. 5 is a cross-sectional view taken on line A-A of FIG. 4. FIG. 6 is a side elevation of the main portions of the dispensing arm 32. FIG. 7 is an enlarged cross-sectional view of the main portions of the dispensing arm 32. FIG. 8 is a perspective view of the main portions of the dispensing arm 32.

As shown in FIGS. 3-5, the dispensing arm 32 has the arm member 51, a probe holder assembly 52, two vibration dampers 53A, 53B, a collision detection sensor 54, and substrates 56. Furthermore, as shown in FIGS. 6 and 7, the dispensing arm 32 has a collision detection member 57 and an elastic member 59.

The arm member 51 has a main surface portion 51a and two side surface portions 51b. The main surface portion 51a is made of a flat rectangular plate member. The side surface portions 51b substantially vertically extend continuously from both lateral side ends of the main surface portion 51a. The support shaft 44 (see FIG. 2) is secured to one longitudinal end of the main surface portion 51a. The probe holder assembly 52 is positioned at the other longitudinal end of the main surface portion 51a. The substrates 56 are positioned at a longitudinal intermediate portion of the main surface portion 51a. As shown in FIG. 7, an insertion hole 51c is formed at the other longitudinal end of the main surface portion 51a where the probe holder assembly 52 is positioned.

As shown in FIGS. 3 and 4, the two vibration dampers 53A, 53B are mounted to the arm member 51. A first fixed portion 53a is formed at one longitudinal end of each of the two vibration dampers 53A, 53B. A second fixed portion 53b is formed at the other longitudinal end of each vibration damper 53A or 53B.

The first fixing portions 53a of the two vibration dampers 53A, 53B are mounted to one longitudinal end of the arm member 51 via set screws 90. The second fixed portions 53b of the two vibration dampers 53A, 53B are mounted to the probe holder assembly 52 via set screws 90, the probe holder assembly 52 being placed on the arm member 51. Consequently, the two vibration dampers 53A and 53B are bridged between the one longitudinal end of the arm member 51 and the probe holder assembly 52.

In mounting the first fixed portions 53a and the second fixed portions 53b, they may be firmly tightened against one and other ends of the arm member 51 with the set screws 90. Alternatively, the first fixed portions 53a and the second fixed portions 53b may be held with some free play to the one and other ends of the arm member 51.

The two vibration dampers 53A and 53B are mounted at a given angle to the longitudinal direction of the arm member 51. The first vibration damper 53A and the second vibration damper 53B are positioned so as to be tilted in opposite directions relative to the arm member 51. Therefore, a longitudinal intermediate portion 53c of the first vibration damper 53A and a longitudinal intermediate portion 53c of the second vibration damper 53B intersect each other over the arm member 51. The intermediate portion 53c of the first vibration damper 53A is located vertically below the intermediate portion 53c of the second vibration damper 53B.

The two vibration dampers 53A and 53B cooperate to suppress vibrations produced in the dispensing probe 33 when the dispensing arm 32 rotates or moves vertically.

In the description of the present embodiment, the two vibration dampers 53A and 53B are arranged to intersect each other. The present invention is not restricted to this arrangement. The two vibration dampers 53A and 53B may be arranged substantially parallel to each other. Further, there may be provided only one vibration damper. In addition, there may be provided three or more vibration dampers. The configurations of the two vibration dampers 53A and 53B are described in detail later.

The probe holder assembly 52 is next described. As shown in FIGS. 7 and 8, the probe holder assembly 52 is attached to the arm member 51 and holds the dispensing probe 33. The probe holder assembly 52 has a first probe holder 61, a second probe holder 62, a third probe holder 63, a first support spring 64, second support springs 65, and a support spring adjusting nut subassembly 67. The collision detection sensor 54 is mounted to the probe holder assembly 52.

The first probe holder 61, second probe holder 62, and third probe holder 63 are stacked on top of each other vertically. The first probe holder 61 has a cylindrical portion 71 and a support portion 72. The cylindrical portion 71 is shaped substantially in the form of a cylinder and provided with a first insertion hole 71a which extends axially through the cylindrical portion 71. The dispensing probe 33 is slidably inserted in the first insertion hole 71a. The dispensing probe 33 is supported by the first probe holder 61 via the first insertion hole 71a so as to be slidable axially.

The cylindrical portion 71 is inserted in the insertion hole 51c formed in the main surface portion 51a of the arm member 51. The cylindrical portion 71 protrudes downward from the vertical lower surface of the main surface portion 51a. The cylindrical portion 71 has an outside diameter smaller than the diameter of the opening in the insertion hole 51c.

A first support spring 64 is mounted to the cylindrical portion 71 protruding from the main surface portion 51a of the arm member 51. The first support spring 64 is, for example, made of a compression coil spring.

A threaded portion 71b made of an internal thread is formed on the outer peripheral surface of the cylindrical portion 71 protruding from the main surface portion 51a of the arm member 51. The support spring adjusting nut subassembly 67 makes a threaded engagement with the threaded portion 71b. The support spring adjusting nut subassembly 67 is made up of a first adjusting nut 67a and a second adjusting nut 67b. The first adjusting nut 67a is located vertically above the second adjusting nut 67b.

The first support spring 64 has one end mounted to the lower surface of the main surface portion 51a, while the other end of the spring 64 is mounted to a vertical upper end portion of the first adjusting nut 67a of the support spring adjusting nut subassembly 67. Consequently, the first support spring 64 is interposed between the support spring adjusting nut subassembly 67 and the lower surface of the main surface portion 51*a*. The amount of compression of the first support spring 64 can be adjusted by adjusting the amount of tightening of the support spring adjusting nut subassembly 67.

The first support spring 64 dampens vibrations produced in the dispensing probe 33 and in the probe holder assembly 52 when the dispensing arm 32 rotates or moves vertically.

The support portion 72 is formed continuously around one axial end of the cylindrical portion 71, i.e., vertical upper portion. When the cylindrical portion 71 is inserted in the insertion hole 51*c*, the support portion 72 is placed on the upper surface side of the main surface portion 51*a*. The elastic member 59 is interposed between the support portion 72 and the upper surface of the main surface portion 51*a*.

The elastic member 59 is made, for example, of a sheet of rubber or gel. When the dispensing arm 32 rotates or moves vertically, the elastic member 59 suppresses vibrations produced in the probe holder assembly 52. In consequence, vibrations produced in the dispensing probe 33 held to the probe holder assembly 52 are suppressed.

The support portion 72 is shaped substantially cylindrically. A support hole 72*a*, a slit 72*b*, and a connection hole 72*c* are formed in the support portion 72.

The support hole 72*a* extends axially through the support portion 72 and is in communication with the first insertion hole 71*a* formed in the cylindrical portion 71. The support hole 72*a* has an inside diameter set larger than the inside diameter of the first insertion hole 71*a*. The second probe holder 62 (described later) is inserted in the support hole 72*a*. The second probe holder 62 is supported by the support hole 72*a* in the support portion 72 so as to be slidable axially (i.e., vertically). A first terminal electrode 85 that makes contact with the dispensing probe 33 is disposed at the end of the support hole 72*a* located closer to the cylindrical portion 71.

The slit 72*b* is formed by cutting out a part of the outer peripheral surface of the support portion 72 axially of the support portion 72, and is in communication with the support hole 72*a*. Electric wiring 85*a* connected with the first terminal electrode 85 is inserted in the slit 72*b*. The wiring 85*a* is also connected with the substrates 56.

The connection hole 72*c* is formed externally around the support hole 72*a* in the support portion 72. The connection hole 72*c* extends axially through the support portion 72. The support portion 72 is connected with the main surface portion 51*a* of the arm member 51 by bringing a connective screw 91 into threaded engagement with the connection hole 72*c*.

In the present embodiment, the support portion 72 is shaped substantially cylindrically. The shape of the support portion 72 is not restricted to this example. Rather, the support portion 72 may be shaped in various other forms including rectangular prism and elliptical column.

The second probe holder 62 is supported to the support portion 72 of the first probe holder 61. The second probe holder 62 has a fixed surface portion 74 and a sliding portion 75. The sliding portion 75 is shaped substantially cylindrically. The sliding portion 75 is inserted in the support hole 72*a* of the support portion 72 and slidably supported to the support portion 72.

A second insertion hole 75*a* is formed in the sliding portion 75 and extends axially through the sliding portion 75. When the sliding portion 75 is inserted in the support hole 72*a*, the second insertion hole 75*a* of the sliding portion 75 faces the support hole 72*a*. The dispensing probe 33 is inserted in the second insertion hole 75*a*.

The fixed surface portion 74 is formed continuously with one axial end, i.e., vertical upper end, of the sliding portion 75. The fixed surface portion 74 is shaped like a disk. The fixed surface portion 74 protrudes nearly vertically and radially outwardly from the one axial end of the sliding portion 75.

A counterbored hole 74*a* is formed in the fixed surface portion 74 coaxially with the second insertion hole 75*a* formed in the sliding portion 75. A second electrode terminal 86 that makes contact with the dispensing probe 33 is positioned in the counterbored hole 74*a*. Electrical wiring 86*b* is connected with the second electrode terminal 86 and with the substrates 56. A part of the third probe holder 63 is inserted in the counterbored hole 74*a*.

The fixed surface portion 74 has a mounting portion 74*b* and a securing hole 74*c*. The mounting portion 74*b* is formed in the outer peripheral surface of the fixed surface portion 74. The collision detection sensor 54 is mounted to the mounting portion 74*b* via a mounting screw 94. The collision detection sensor 54 protrudes substantially vertically and radially outwardly from the outer peripheral surface of the fixed surface portion 74.

The securing hole 74*c* is formed in the outer peripheral portion of the counterbored hole 74*a* of the fixed surface portion 74. A set screw (not shown) for securing the third probe holder 63 to the second probe holder 62 makes a threaded engagement with the securing hole 74*c*.

The third probe holder 63 is positioned on the upper surface portion of the fixed surface portion 74 of the second probe holder 62 and secured to the second probe holder 62 via set screws (not shown). The second probe holder 62 and the third probe holder 63 together constitute the second probe holder subassembly (which may herein simply be referred to as the second probe holder) of the present invention.

The third probe holder 63 has a probe-securing portion 76 and a flange portion 77. The flange portion 77 is shaped like a disk and rests on the fixed surface portion 74 of the second probe holder 62. The flange portion 77 has an end portion closer to the second probe holder 62, and this end portion is inserted in the counterbored hole 74*a* of the fixed surface portion 74.

A securing hole 77*a* is formed at the position in the flange portion 77 opposite to the securing hole 74*c* of the fixed surface portion 74. A set screw (not shown) is inserted in the securing hole 77*a* to secure the second probe holder 62 and the third probe holder 63.

As shown in FIG. 8, each of the second support springs 65 has one end mounted to the flange portion 77, the other end being mounted to the support portion 72 of the first probe holder 61. The second support springs 65 couple together the first probe holder 61, second probe holder 62, and third probe holder 63. The second support springs 65 bias the second probe holder 62 and third probe holder 63 toward the first probe holder 61.

The spring constant of the combination of the two second support springs 65 is set smaller than the spring constant of the first support spring 64. That is, the second support springs 65 are softer than the first support spring 64. For example, compression coil springs are used as the second support springs 65.

The number of the second support springs 65 is not restricted to two. There may be provided only one second support spring 65. Alternatively, there may be provided three or more second support springs 65.

The second fixed portions 53b of the two vibration dampers 53A and 53B are secured to the flange portion 77 via set screws 90. The second probe holder 62 and third probe holder 63 are biased toward the first probe holder 61 by the two vibration dampers 53A, 53B.

As shown in FIG. 7, the probe-securing portion 76 is formed to be continuous with the surface of the flange portion 77 that faces away from the second probe holder 62. A probe-securing hole 76a is formed in the probe-securing portion 76 and extends vertically through the third probe holder 63. The probe-securing hole 76a is in communication via a step portion 76b (described later) with the counterbored hole 74a and second insertion hole 75a formed in the second probe holder 62. An internal thread is formed in the inner wall of the probe-securing hole 76a. The dispensing probe 33 is inserted from vertically above into the probe-securing hole 76a.

The step portion 76b is formed at the end of the probe-securing hole 76a which is located on the side of the second probe holder 62 (i.e., vertical lower end). The step portion 76b is formed by setting the diameter of the opening in the lower end of the probe-securing hole 76a smaller than other portions. The dispensing probe 33 inserted in the probe-securing hole 76a has a base end portion 33a that bears against the step portion 76b.

A mechanical connector (not shown) for connecting purposes is screwed into the probe-securing hole 76a. The base end portion 33a of the dispensing probe 33 is sandwiched between the mechanical connector (not shown) and the step portion 76b. Consequently, the dispensing probe 33 can be secured on the dispensing arm 32. Furthermore, the dispensing probe 33 can be placed in position relative to the dispensing arm 32. The mechanical connector is connected with a pump via a suction tube. As a result, the dispensing probe 33 and the pump are connected together.

In the present embodiment, the second probe holder 62 and the third probe holder 63 are separate and distinct members. The configuration of these two holders is not restricted to this example. The second probe holder 62 and the third probe holder 63 may be fabricated integrally.

Figure 9:
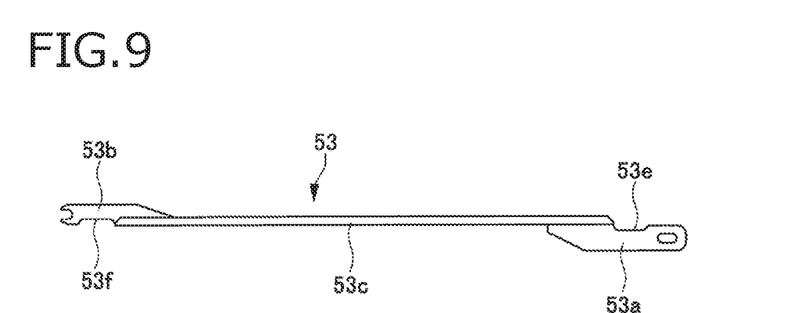
FIG. 9 is a plan view of a vibration damper associated with one embodiment of the present invention.

The configuration of the vibration dampers 53A and 53B is next described by referring to FIG. 9, which is a plan view of the vibration dampers. The vibration dampers 53A and 53B are identical in configuration and thus they are herein collectively referred to as the vibration dampers 53.

As shown in FIG. 9, each vibration damper 53 is fabricated by bending a mechanical member in the form of a flat plate. The vibration damper 53 has the first fixed portion 53a and the second fixed portion 53b each of which is shaped in the form of a flat plate. The first fixed portion 53a and second fixed portion 53b are interconnected by an intermediate portion 53c. A first cutout 53e is formed in each first fixed portion 53a. A second cutout 53f is formed in the second fixed portion 53b. Elasticity is imparted to the first fixed portions 53a and the second fixed portions 53b by the first cutouts 53e and the second cutouts 53f, respectively, so that the fixed portions 53a and 53b can deform elastically.

A higher degree of elasticity is provided to the intermediate portion 53c than the first and second fixed portions 53a, 53b by bending the mechanical member in the form of a flat plate.

In the present embodiment, elasticity is imparted to the first fixed portion 53a and the second fixed portion 53b which are located at opposite ends of each vibration damper 53 by forming the cutouts 53e and 53f. The configuration of the first and second fixed portions 53a, 53b is not restricted to this example. For example, the first fixed portion 53a and the second fixed portion 53b which are located at opposite ends of each vibration damper 53 may be made of leaf springs. Furthermore, various other configurations may be employed to impart elasticity to the opposite ends of each vibration damper 53.

In the above embodiment, the cutouts 53e and 53f are formed in the first fixed portion 53a and the second fixed portion 53b, respectively, to provide elasticity to these fixed portions. The configuration of the fixed portions is not restricted to this example. For example, a cutout or cutouts may be formed in at least one of the first fixed portion 53a and the second fixed portion 53b to provide elasticity. That is, at least one of the first fixed portion 53a and the second fixed portion 53b may have elasticity.

Figure 10:
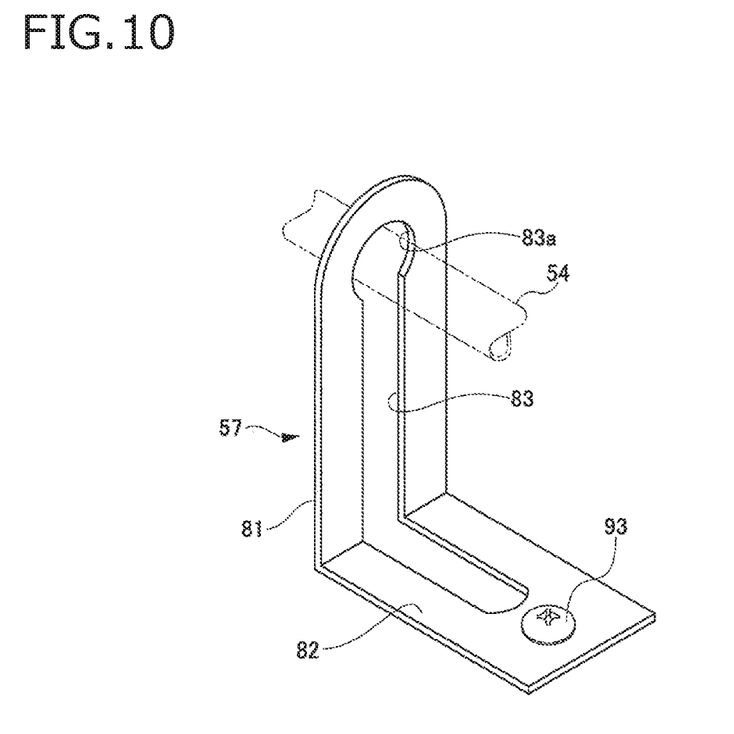
FIG. 10 is a perspective view of a collision detection member for use with the dispensing unit shown in FIGS. 1-9.

The configuration of the collision detection member 57 is next described by referring to FIG. 10 which is a perspective view of the collision detection member 57. As shown in FIG. 10, the collision detection member 57 is fabricated by bending a mechanical member in the form of a flat plate into a substantially L-shaped form. The collision detection member 57 has a detection portion 81 and a fixed portion 82 extending substantially vertically and continuously from the detection portion 81.

The collision detection member 57 is provided with a slit 83 extending continuously from the detection portion 81 to the fixed portion 82. A detection hole 83a is formed at the end of the slit 83 on the side of the detection portion 81. The detection hole 83a is a substantially circular opening. The collision detection sensor 54 is inserted into the detection hole 83a. The collision detection member 57 is spaced from the periphery of the detection hole 83a and from the collision detection sensor 54.

As shown in FIG. 7, the fixed portion 82 is positioned on the main surface portion 51a of the arm member 51 and secured to the main surface portion 51a of the arm member 51 with a set screw 93. The detection portion 81 stands substantially uprightly from the main surface portion 51a. As shown in FIG. 10, the collision detection sensor 54 is inserted in the detection hole 83a of the detection portion 81. A given spacing is left between the periphery of the detection hole 83a and the collision detection sensor 54. When the collision detection sensor 54 touches the periphery of the detection hole 83a in the collision detection member 57, the sensor 54 detects that there is a collision of the dispensing probe 33. Each of the detection portion 81 and the fixed portion 82 is made, for example, of a leaf spring and designed to be deformable elastically.

The shape of the opening in the detection hole 83a is not restricted to a circular form. Rather, the shape is appropriately set according to the shape of the collision detection sensor 54. For example, where the collision detection sensor 54 is a rectangular column in shape, the detection hole 83a is shaped rectangularly in conformity with the sensor 54.

2. Example of Operation of Dispensing Arm

Figure 11A:
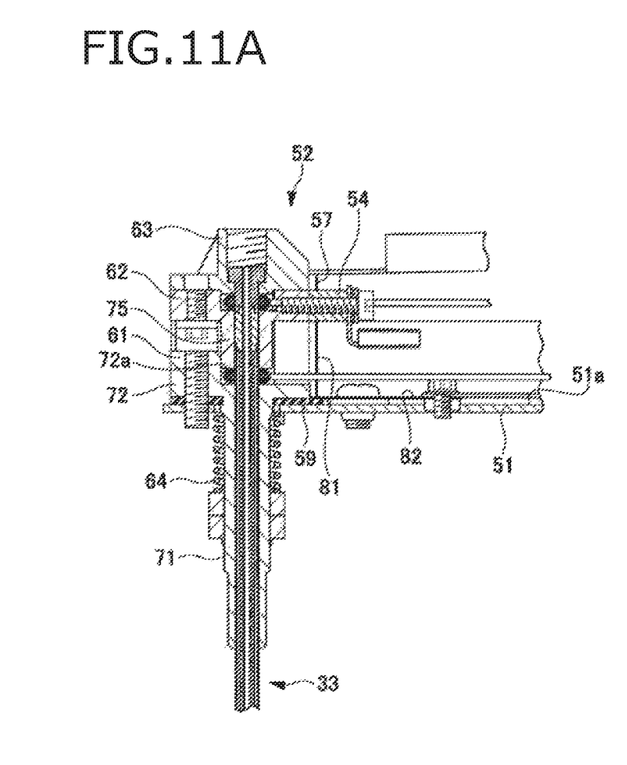
FIG. 11A is a cross-sectional view illustrating an operational state of the dispensing unit of FIG. 7 assumed prior to a collision.
Figure 11B:
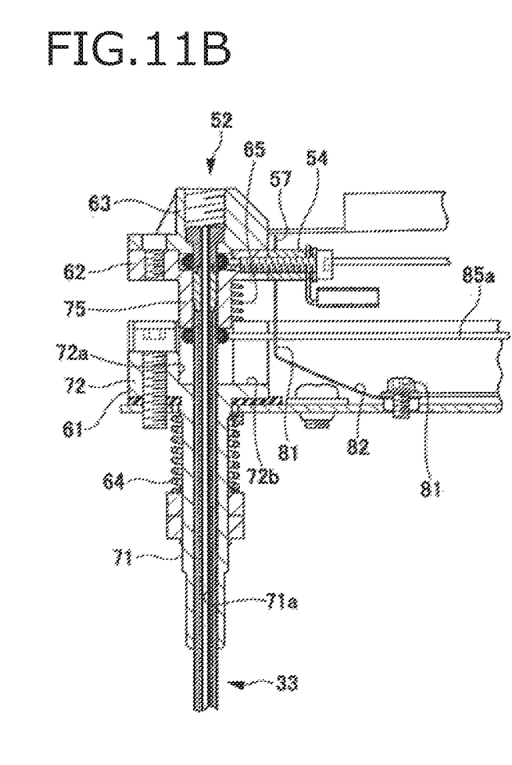
FIG. 11B is a cross-sectional view similar to FIG. 11A, but illustrating an operational state of the dispensing unit during a collision.

An example of the operation of the dispensing arm 32 of the configuration described above is next described by referring to FIGS. 11A and 11B. In the following description, an example is given in which the dispensing probe 33 collides with other member. FIG. 11A is a cross-sectional view illustrating an operational state assumed prior to the collision. FIG. 11B is a cross-sectional view illustrating an operational state assumed during the collision.

The front end of the dispensing probe 33 collides with the first reagent receptacle 24, the reaction receptacles 26 (see FIG. 1), and so on, applying a load vertically to the dispensing probe 33. Also, a vertical load is applied via the dispersing probe 33 to the second probe holder 62 and third probe holder 63 holding the dispensing probe 33.

As shown in FIG. 11B, the second probe holder 62 and third probe holder 63 cause the support portion 72 of the first probe holder 61 to slide vertically upwardly against the biasing force of the second support springs 65. This separates the second probe holder 62 and the third probe holder 63 from the first probe holder 61. Furthermore, the dispensing probe 33 slides along the first insertion hole 71a in the first probe holder 61.

As described previously, the spring constant of the combination of the second support springs 65 is set smaller than that of the first support spring 64. Consequently, the second probe holder 62 and the third probe holder 63 are allowed to move because the first support spring 64 does not compress but the second support springs 65 elongate.

Because the second probe holder 62 and the third probe holder 63 move vertically upwardly, the other ends of the two vibration dampers 53A and 53B secured to the third probe holder 63 are raised vertically upwardly. The vibration dampers 53A and 53B of the present embodiment are provided with the cutouts 53e and 53f, respectively, whereby elasticity is imparted to the opposite ends of each damper.

Thus, as the second probe holder 62 and the third probe holder 63 move, the opposite ends of each of the vibration dampers 53A and 53B deform elastically. As a result, it is possible to prevent the two vibration dampers 53A and 53B from hindering movement of the second probe holder 62 and the third probe holder 63; otherwise, the two vibration dampers 53A and 53B would deform elastically and become bent.

Because the second probe holder 62 moves vertically upwardly, the collision detection sensor 54 mounted to the second probe holder 62 moves vertically upwardly. Therefore, the collision detection sensor 54 makes contact with the periphery of the detection hole 83a (see FIG. 10) in the collision detection member 57. Consequently, a collision with the dispensing probe 33 can be detected.

Because the collision detection sensor 54 moves vertically upwardly, the collision detection member 57 is also raised vertically. Since elasticity is imparted to the detection portion 81 and the fixed portion 82 of the collision detection member 57, the detection portion 81 and fixed portion 82 deform elastically as shown in FIG. 11B. This can prevent the movement of the second probe holder 62 and the third probe holder 63 from being hindered by the collision detection member 57. Furthermore, it is possible to prevent damage both to the collision detection member 57 and to the collision detection sensor 54.

If a collision of the dispensing probe 33 is avoided, the second support springs 65 bias the second probe holder 62 and the third probe holder 63 into placement again on the first probe holder 61 as shown in FIG. 11A.

In this way, in the dispensing arm 32 of the present embodiment, the probe holder assembly 52 is designed as a split structure including the first, second, and third probe holders 61, 62, 63. Furthermore, there are provided the second support springs 65 for absorbing impacts during a collision. Consequently, when a collision of the dispensing probe 33 occurs, damage to the dispensing probe 33 and the collided object can be reduced while maintaining the vibration-suppressing function realized by the first support spring 64 and the vibration dampers 53A, 53B.

It is to be understood that the present invention is not restricted to the embodiment described above and shown in the accompanying drawings and that the invention can be practiced in variously modified forms without departing from the gist of the invention set forth in the claims.

For example, an example has been given in which an automated analyzer is applied to a biochemical analyzer used in analysis of biological samples such as blood and urine. The automated analyzer is not restricted to this example but can be applied to instruments which perform various other analyses such as on water quality, foods, and so on.

The invention claimed is:

1. A dispensing unit comprising:
a dispensing probe for aspirating and dispensing liquid;
a drive mechanism having a support shaft that is supported so as to be rotatable peripherally and movable vertically;
an arm member mounted to the support shaft and having first and second ends on mutually opposite sides;
a first probe holder which is attached to the arm member at the first end thereof and by which the dispensing probe is supported so as to be movable vertically;
a second probe holder which is supported to the first probe holder so as to be movable vertically and which holds the dispensing probe;
a first support spring having a spring constant and interposed between the arm member and the first probe holder, the first support spring operating to suppress vibrations produced in the dispensing probe;
second support springs for biasing the second probe holder against the first probe holder and in combination having a spring constant smaller than the spring constant of the first support spring; and
vibration dampers bridged from the second end of the arm member to the second probe holder, thus suppressing vibrations produced in the dispensing probe,
wherein each of said vibration dampers has a first fixed portion mounted to said arm member and a second fixed portion mounted to said second probe holder, and wherein at least one of the first and second fixed portions has elasticity.

2. A dispensing unit as set forth in claim 1, wherein at least one of said first fixed portion and said second fixed portion is shaped in the form of a flat plate, whereby elasticity is imparted thereto.

3. A dispensing unit as set forth in claim 2, wherein at least one of said first fixed portion and said second fixed portion is provided with a cutout.

4. A dispensing unit as set forth in claim 1, further comprising:
a collision detection sensor attached to said second probe holder; and a collision detection member secured to said arm member and provided with a detection hole in which the collision detection sensor is inserted;
wherein, when there is a contact with the detection hole, the collision detection sensor detects a collision of the dispensing probe.

5. A dispensing unit as set forth in claim 4, wherein said collision detection member has elasticity.

6. A dispensing unit as set forth in claim 1, wherein said first probe holder has:
a support portion by which said second probe holder is slidably supported; and
a cylindrical portion provided with an insertion hole in which said dispensing probe is slidably inserted.

7. A dispensing unit as set forth in claim 6, wherein said support portion is provided with a support hole into which a part of said second probe holder is slidably inserted, and wherein the support hole is in communication with said insertion hole formed in said cylindrical portion.

8. An automated analyzer comprising:
a photometer;
a container unit having a plurality of receptacles where liquid is accommodated; and
a dispensing unit for aspirating and dispensing the liquid;
wherein said dispensing unit has:
a dispensing probe for aspirating and dispensing the liquid;
a drive mechanism having a support shaft which is supported by the drive mechanism so as to be rotatable peripherally and movable vertically;
an arm member mounted to the support shaft having first and second ends on mutually opposite sides;
a first probe holder mounted to the arm member at the first end thereof and supporting the dispensing probe such that the dispensing probe is movable vertically;
a second probe holder supported to the first probe holder so as to be movable vertically and holding the dispensing probe;
a first support spring interposed between the arm member and the first probe holder and operative to suppress vibrations produced in the dispensing probe, said first support spring having a spring constant;
second support springs for biasing the second probe holder against the first probe holder, the second support springs in combination having a spring constant smaller than the spring constant of the first support spring; and
vibration dampers bridged from the second end of the arm member to the second probe holder, thus suppressing vibrations produced in the dispensing probe,
wherein each of said vibration dampers has a first fixed portion mounted to said arm member and a second fixed portion mounted to said second probe holder, and wherein at least one of the first and second fixed portions has elasticity.

* * * * *